June 10, 1941.  A. S. NORCROSS  2,244,722
AUTOMATIC CONTROL SYSTEM
Filed Oct. 21, 1937  2 Sheets—Sheet 1

INVENTOR
Austin S. Norcross
BY
ATTORNEYS

Fig. 4.

INVENTOR
Austin S. Norcross
BY Parker, Carlson, Pitzner & Hubbard
ATTORNEYS

Patented June 10, 1941

2,244,722

UNITED STATES PATENT OFFICE 2,244,722

AUTOMATIC CONTROL SYSTEM

Austin S. Norcross, Waban, Mass.

Application October 21, 1937, Serial No. 170,261

19 Claims. (Cl. 34—52)

This invention relates to an automatic control system for regulating the movements of a regulating device to maintain a condition to be controlled at a substantially uniform value.

The general object is to provide a control system of the above character which is applicable to the control of a wide variety of conditions, which is reliable in operation, which is extremely sensitive due to the use of a vacuum tube circuit for detecting changes in the controlled condition, which may be adapted quickly and conveniently to changes in the character of the controlled medium and which may be adapted for use alternatively with a manually operable control.

A more detailed object is to provide a control system of the above character having a vacuum tube control circuit for measuring variations in the condition being controlled and a novel means of modifying the action from the control circuit so as to position the regulating device with a so-called proportioning action.

Another object is to provide a novel arrangement for facilitating testing and adjustment of a control of the above character.

A further object is to combine a manual control with the automatic control and provide automatically acting means for disabling the automatic control mechanism while the manual control is in use.

Still another object is to provide a novel arrangement by which the range of the proportioning action may be varied selectively without destroying the adjustment of the control as a whole.

Other objects and advantages of the invention will become apparent from the following detailed description taken in connection with the accompanying drawings, in which—

The invention is applicable to the control of various kinds of regulating devices such as valves, dampers, speed changers, etc. for regulating a wide variety of conditions to be controlled. For purposes of illustration, however, the invention is shown in the drawings and will be described herein as applied to the control of drying apparatus for maintaining a uniform moisture content in a traveling web of cloth or the like. I do not intend to limit the invention by such disclosure but aim to cover all modifications and alternative methods, constructions, and uses falling within the spirit and scope of the invention as expressed in the appended claims.

The controlled apparatus shown is of the type commonly known as a tenter and employed for drying a traveling web 5 of cloth or the like after final washing thereof. The tenter comprises a housing 6 providing an elongated chamber 7 through which the web is fed from a wet roll 8 at one end of the chamber to a dry roll 9 at the opposite end. The web is advanced through the drying chamber by endless belts 10 carrying suitable clamps indicated diagrammatically at 11 for gripping opposite side edges of the web to hold it taut. Preferably, the belt sprockets 12 are driven by an electric motor 13 operating through suitable speed reducing mechanism indicated at 14.

Air for drying the cloth is heated by means such as a coil 15 supplied with steam or other heating medium and preferably maintained at a uniform temperature by means such as a thermostatically controlled valve 16. By operation of a power driven blower 17, air is forced through the heater and then through the chamber 7 in a direction reverse to the movement of the web 5. By varying the rate of travel of the web, the temperature of the heater 15 or the volume of air flowing through the chamber, the drying capacity of the tenter, that is, the ability to reduce the moisture content of the dried cloth as it passes through the chamber 7, may be regulated. In the present instance, such regulation is effected by varying the speed of the motor 13 which for this purpose is of the so-called shunt type having its field winding 18 (Fig. 4) adapted to be energized to a predetermined degree from a source of direct current and its armature 19 variably energized to determine the motor speed.

Control of the motor speed is effected in the present instance by a rheostat 20 arranged to vary the current in the motor armature circuit in accordance with changes in the position of the rheostat arm 21 which constitutes the movable regulating member in the present control system.

Herein the arm 21 is arranged to be oscillated varying distances back and forth across the resistance element 22 of the rheostat by an electric motor 23 operating through speed reduction gearing 24 to drive a shaft 25 on which the arm 21 is fast. Preferably, the motor 23 is of the shaded pole induction type having a winding 26 normally energized from a source of alternating current and a squirrel cage rotor 28 arranged to turn clockwise and counter-clockwise respectively according to which of two sets of shading coils 29 and 30 is short-circuited, the rotor remaining idle when both coils are open-circuited. Operation of the motor 23 is controlled by two switches 31 and 32 having a common contact 33 connected by a conductor 34 to the common terminal of the shading coils. The insulated terminals of the respective coils 29 and 30 are connected by conductors 35 and 36 to the stationary contacts of the switches 31 and 32. Switches 37 interposed in the conductors 35 and 36 and actuated by cams 38 on the shaft 25 operate to interrupt the operation of the motor 23 in opposite limit positions of the arm 21.

The control system constituting the present invention operates automatically to detect deviations in the condition being controlled from a predetermined value, that is, the moisture content of the dried cloth and in response to such deviations to vary the position of the regulating device or arm 21 so as to maintain the controlled condition accurately and substantially at said value. Detection of such deviations is effected by continuously measuring an electrical characteristic of the web 5 which varies with the moisture content and by indicating deviations of this characteristic in opposite directions from a predetermined value corresponding to the moisture content desired to be maintained. In the present instance, the alternating current resistance of the web is the characteristic measured in order to avoid the introduction of errors due to polarization, electrostatic charges, etc. The resistance measurement is made at a point beyond the outlet end of the drying chamber 7. For this purpose, the web passes between two electrodes 40 and 41, one formed by the flat surface of a bar 42 stationarily mounted on the tenter frame. The other electrode comprises a plate supported by pivots 43 and urged downwardly toward the bar by gravity and a spring 44. The pivots are carried by a bracket 45 supported by and insulated from the tenter housing.

The electrodes 40 and 41 with the variable cloth resistance therebetween are interposed in an electric circuit, and variations in voltage drop through the cloth resulting from changes in cloth resistance are utilized through a suitable vacuum tube arrangement to actuate a sensitive magnetic relay 46 by which selective operation of the control switches 31 and 32 is governed and the speed of the web driving motor 13 is varied. Preferably, the relay 46 is of the galvonometer type comprising a rotor 47 carrying a winding 48 and an arm 49 on which the contact 33 of the control switches is mounted. The rotor 47 is pivotally supported between the poles 50 of a permanent magnet and a return spring is provided so that when the rotor winding is energized to a predetermined degree, the contact 33 will balance between the cooperating switch contacts, both control switches then being open. As the current rises above this predetermined value, the switch 31 will be closed. The switch 32 is closed in response to a fall in the relay energizing current.

To impress a voltage upon the cloth sample, the electrodes 40 and 41 are connected across the terminals of a section 52 of a potentiometer 53 and in series with an adjustable rheostat 54 and a control switch 55 having normally closed contacts 56 and 57. The circuit extends from the electrode 41 through a conductor 58, the switch 56, a conductor 59, the rheostat 54, a conductor 61, the resistance section 52, a conductor 62, the switch 57, a conductor 63 to the electrode 40. Current is supplied to the potentiometer 53 from a secondary winding 64 of a transformer designated generally by the numeral 65. Primary winding 66 of this transformer is supplied with alternating current from the regulated voltage source 27.

The voltage drop between the electrodes is used to vary the grid voltage of a three element vacuum tube 67 biased to act as a rectifying detector so that in accordance with the well known characteristics of such tubes, the output current of the tube will be varied correspondingly. Current for heating the tube filament or cathode 68 is supplied from a secondary winding 69 of the transformer. High potential current may be conveniently supplied to the plate 70 of the tube from a vacuum tube type of half-wave rectifier 71 whose output is applied to a potentiometer 78. The rectifier tube embodies a cathode 72 supplied with heating current from a secondary winding 73 of the transformer and a plate 74 having a high alternating current voltage applied thereto from still another secondary winding 75 of the transformer. Output leads 76 and 77 of the rectifier are connected across the opposite terminals of the potentiometer 78, and a filter condenser 79 in shunt therewith aids in smoothing out the current.

Section 81 of the potentiometer 78 is utilized to supply a negative grid bias to the grid 82 of vacuum tube 67. To this end, the terminal of an adjustable slider 80 by which the grid bias may be varied is connected to the filament 68 of the vacuum tube while one of the potentiometer end terminals is connected to the grid 82 through a conductor 83, the electrodes, the conductor 63, the switch 57, the conductor 62, and a conductor 84. With this arrangement, variations in the potential drop between the electrodes 40 and 41 caused by variations in the resistance of the web will vary the peak grid voltage and therefore change the average output of the vacuum tube 67.

The output current is utilized to actuate the relay 46 and also a milliammeter 85. The ammeter may be calibrated to indicate deviations of the moisture content of the cloth from a value desired to be maintained. The output circuit extends from the plate 70 through a conductor 86, a choke 87, the ammeter 85, a conductor 88, the winding 48, a conductor 89, a rheostat 90, a conductor 91, resistances 92 and 93 to the filament 68. The plate voltage is thus determined by the potential drop because the resistances 92 and 93. The choke 87 and a filter condenser 94 operate to smooth out the plate current.

A testing circuit is associated with the electrodes 40 and 41 in order to facilitate checking of the circuit condition. For this purpose, resistors 95 and 96 are connected in series relation and arranged to be substituted in the potentiometer circuit in place of the cloth sample and the rheostat 54. The resistor 96 is connected to the adjustable contact of the potentiometer while the other resistor is connected through a switch 97 and the conductor 62 to the other potentiometer terminal. The common terminal of the resistors is grounded and connected to the conductor 83 through a conductor 98 and a switch 99. By opening the switches 56 and 57 and closing the switches 97 and 99, the cloth sample and the active portion of the rheostat 54 will be withdrawn and the resistors 95 and 96 introduced in the potentiometer circuit. The resistors are of equal values so as to divide the voltage of the potentiometer equally.

When a vacuum tube is replaced, when the characteristics of the tube change, or for various other reasons, it becomes necessary to test and readjust the control circuits. For this purpose, the switch 55 is actuated to introduce the resistances 95 and 96 in the control circuit. Then, by adjustment of the potentiometers 53 and 78, the circuits are conditioned for the flow of a predetermined normal current, for example, ten milliamperes in the plate circuit, this being indicated on the ammeter 85. The switch 55 is next operated to reintroduce the rheostat 54 and the electrodes 40 and 41 with the dried cloth therebetween. If the same kind of cloth has been used previously, the setting of the rheostat 54 for the maintenance of the desired moisture content using the fixed normal plate current will be known. Accordingly, the rheostat will be set in the known position and the tenter will be started and operated under the control of the automatic regulating system.

A different procedure is followed when the cloth is of a new kind. In such a case, the rheostat 54 would, after preliminary conditioning of the circuits for the normal plate current, be set in the maximum resistance position and the tenter started. With this setting, the lowest possible moisture content would be maintained. The setting of the rheostat would be advanced periodically until the tenter operator finds by examination that the dried cloth is of approximately the desired moisture content. Then, the moisture content would be determined accurately and the rheostat 54 adjusted in the proper direction. This procedure would be repeated until the setting of the rheostat for maintaining the precise moisture content is established.

The control circuits, when properly conditioned as above described, operate as follows: When the desired moisture content prevails, the voltage drop through the cloth sample will be half that delivered by the potentiometer 53 because with a resistance in the rheostat 54 great enough to take approximately half of the voltage drop across the sample and rheostat combined, the otherwise troublesome effect of the capacitive reactance of the sample is negligible in so far as concerns its effect upon the voltage drop across the sample. The polarities and tube characteristics are such that the normal plate or output current will maintain the relay 46 in balanced condition, both control switches 31 and 32 being open.

Now, assuming that the web 5 becomes abnormally dry, the voltage drop between the electrodes will rise above normal resulting in a proportionate increase in the plate current of the vacuum tube and thereby causing the relay to close the switch 31. This short-circuits the shading coils 29 causing the motor 23 to turn the rheostat arm 21 in a counter-clockwise direction so as to increase the speed of the tenter motor 13. As a result, the drying capacity of the tenter is decreased progressively as long as the control switch 31 remains closed. Conversely, if the web becomes too wet, the voltage between the electrodes falls below the predetermined normal value. The resulting lowering of the alternating current grid voltage reduces the plate or output current of the vacuum tube 67 thereby causing the relay 46 to close the switch 32 which initiates operation of the motor 23 in a direction to turn the rheostat arm 21 clockwise so as to decrease the speed of the web driving motor 13.

The action above described is characteristic of controls of the so-called floating type wherein the regulating device continues to move throughout the duration of a deviation in the controlled condition from the value desired to be maintained. Where, as in the present instance, there is a substantial lag in the response of the medium being controlled to a change in the position of the regulating device, over-correction is apt to occur especially when the deviations of the control condition occur rapidly. To overcome this, the present invention contemplates adaptation of the control above described for operation with a proportioning action so that the regulating device or rheostat arm 21 will assume definite equilibrium positions for each different value of moisture content of the cloth. Preferably, this is accomplished by varying the energization of the relay 46 progressively with changes in the position of the rheostat arm so that the relay will be balanced at a different value of the plate current for each position of the rheostat arm.

In the present instance, such variations are effected by changing the resistance of a shunt arranged in parallel with the relay winding 48. The shunt is formed by a rheostat 100 having a resistance element 101 with one terminal 102 connected by a conductor 103 to the conductor 88. A contact arm 104 wipes across the resistance element 101 and is connected by a conductor 105 to the arm 106 of a second or adjusting rheostat 107 having a resistance element connected at one end to a conductor 108 which is joined to the conductor 91. The resistance element 101 is carried by an insulating body 109 fast on the main control shaft 25. To prevent interruption of the shunt in the event that effective contact between the arm 104 and the resistance element 101 is interrupted by foreign matter or the like, a conductor 110 is extended from the conductor 105 to the terminal 111 of the resistance element.

With the shunt arrangement above described, the proportion of the output or plate current which is shunted around the relay winding 48 will be determined by the position of the contact arm 104 with respect to the rheostat terminal 102. As the shaft 25 and the resistance element 101 turn clockwise in response to closure of the switch 32 following a rise in moisture content above normal, the resistance of the shunt will increase progressively thereby correspondingly increasing the current through the relay winding. This increase will partly counteract the current decrease which caused closure of the control switch 32 so that the relay 46 will be restored to balanced condition and the motor 23 stopped before the moisture content has been reduced to the desired normal value. Similarly, reverse movement of the element 101 initiated in response to a decrease in moisture content results in a decrease in the shunt resistance causing the control switch 31 to be opened before the moisture content has risen to its full value. As a result of such automatic shifting of the control point of the system (the moisture content which the automatic control mechanism maintains) with changes in the position of the rheostat arm 21, the latter will assume different equilibrium positions for each different value of moisture content.

The value of the resistance element 101 is coordinated with the construction of the relay and other parts in a manner such that the range through which the control point will be shifted in the movement of the rheostat arm 21 throughout its full range will be as small as practicable without the attendant danger of producing objectionable hunting. By adjustment of the rheostats 90 and 107, the arms of which are connected by a shaft 112 so as to turn in unison, the range of shift of the control point of the system may be varied as desired without affecting the ratio of current distribution between the relay winding 48 and the shunt in parallel therewith at the normal or mid-position of the contact arm 104. That is to say, the rheostat 90 always bears to the rheostat 107 the same ratio as the winding 48 does to the rheostat 100 when the latter is in its normal or mid-position.

After full advantage has been taken of the proportioning action above described in repositioning the rheostat 20 following a rapid change in moisture content, it is desirable to condition the control for operation with a floating action so as to thereafter effect an accurate restoration of the controlled condition to the precise value desired to be maintained. To this end, means is provided which operates in response to a change in the effective control point of the automatic mechanism to eliminate this shift and restore the desired normal control point at a rate substantially slower than that at which the shift is produced by the proportioning action above described. Such readjustment continues until the control point has been restored precisely to the fixed value corresponding to the moisture content desired to be maintained.

In the present instance, the supplemental adjusting means includes a mechanism for actuating the rheostat 100 to restore a predetermined effective value of the relay shunt. The contact arm 104 is fast on and insulated from a shaft 113 carrying a gear 114 which meshes with a pinion 116 on a shaft 115 carrying a pinion 117 which is normally coupled to a gear 118 of a train 119 driven by a shaded pole induction motor 120. By proportioning the gearing or by adjusting the capacity of a fluid pump 119a driven from one element of the gearing, the speed of the motor 120 is adjusted so that the shaft 113 operates at only a small fraction, for example one-tenth, of the speed of the main shaft 25.

The motor 120 is of the same construction as the motor 23 having shading coils 121 and 122 connected respectively through conductors 123 and 124 to arcuate segments 125 and 126 carried by the insulating disk 109. The segments are arranged in end-to-end relation and spaced apart at their adjacent ends by a short insulating segment 127. Thus, the segments rotate with the resistance element 101 and the shaft 25. A brush 128 narrower than the segment 127 bears against the latter or one of the segments 125 and 126 and is carried by an arm 129 fast on the shaft 113. A conductor 130 connects the brush to the other terminal of each of the shading coils 121 and 122. It will thus be seen that when the brush 128 engages the segment 127, both shading coils will be open-circuited and the shaft 113 will remain stationary. When the segment 126 is engaged by the brush, the coils 122 will be short-circuited and the motor will operate in a direction to turn the shaft 113 counter-clockwise. Clockwise movement of the shaft will result from engagement of the brush and the segment 125. The motor 120 thus controlled will cause the brush 128 to follow the movements of the rheostat arm 21 but at a substantially slower rate. Such following continues until the brush has again moved to a position opposite the segment 127 in the new position of the latter.

OPERATION

Figure 1:
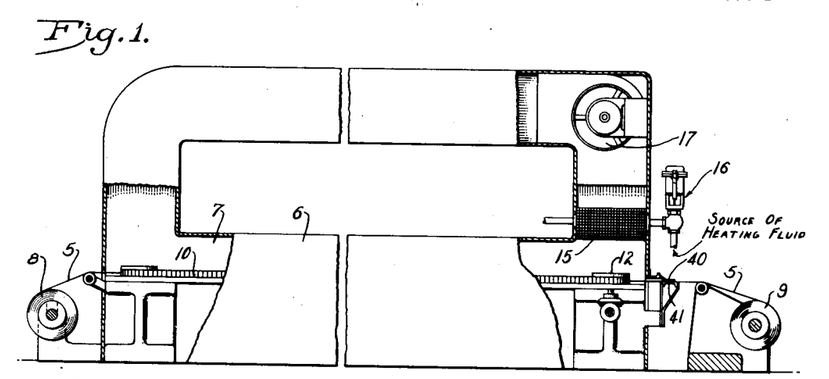
Figure 1 is an elevational view partially broken away of a drying apparatus equipped with a control embodying the present invention.
Figures 2, 3:
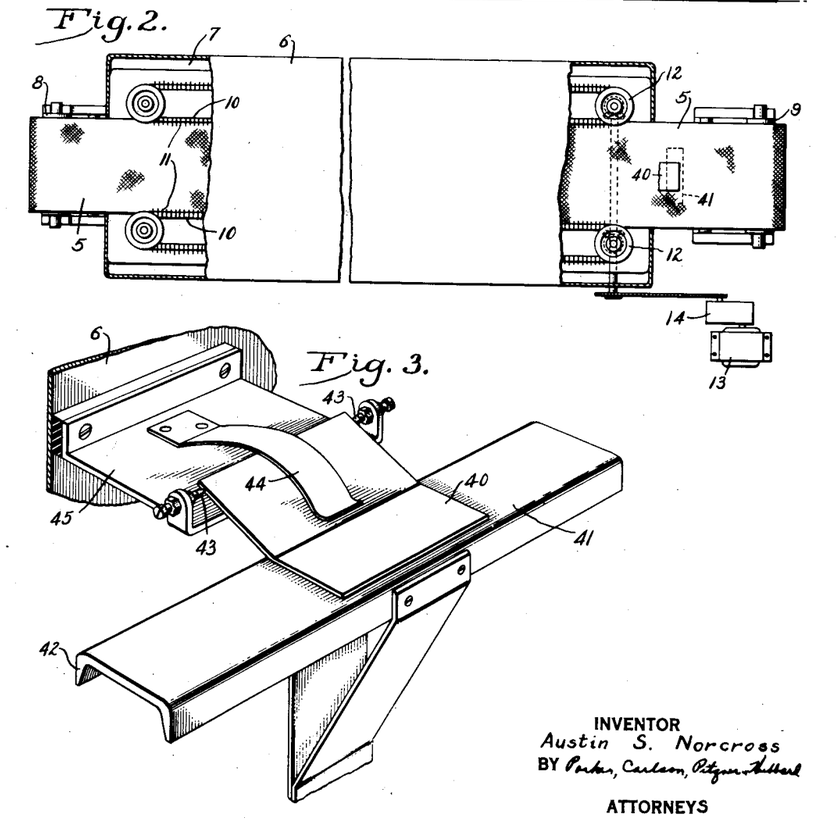
Fig. 2 is a plan view.
Fig. 3 is a fragmentary perspective view of a part of the control system.
Figure 4:
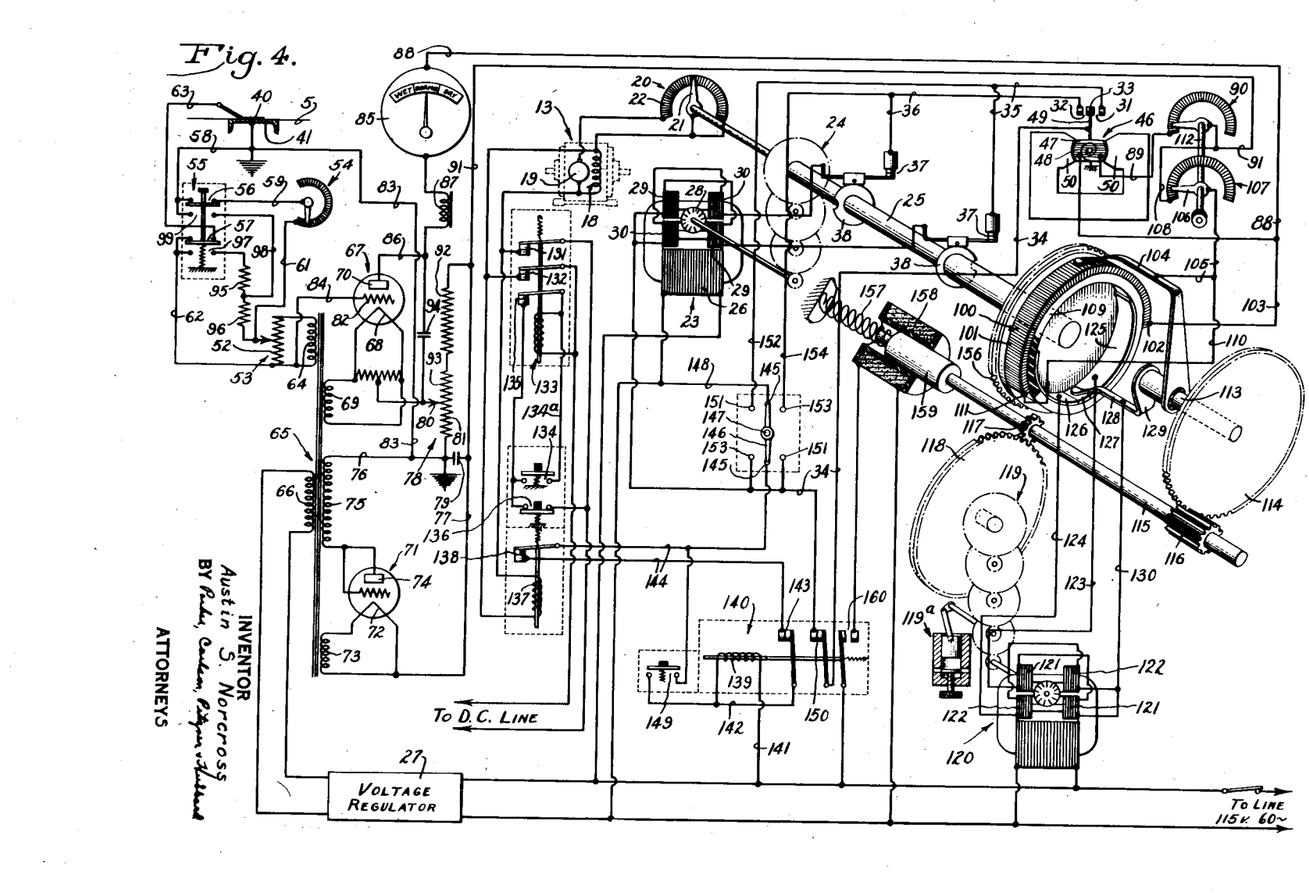
Fig. 4 is a schematic view and wiring diagram.

In explaining the operation of the complete control arrangement, it will be assumed that the control circuits are adjusted in the manner previously described for the maintenance of the desired moisture content, for example, six per cent. When this precise content prevails, the parts will be positioned as shown in Fig. 4, the switch arm 49 being balanced between the stationary contacts under the prevailing degree of energization of the relay winding 48 and the segment 127 engaging the brush 128.

If the moisture content falls rapidly, the relay switch 31 will be closed and the shading coils 29 short-circuited. The motor 23 will start to turn the shaft 25 counter-clockwise operating the rheostat 20 to increase the tenter motor speed at a relatively rapid rate. In this movement, the resistance element 101 turns with the rheostat arm 21 causing the resistance of the relay shunt to be decreased progressively. The resulting decrease in the current energizing the relay winding 48 at the prevailing moisture content of the cloth will continue until the balanced current value has been attained, whereupon the control switch 31 will be opened, and operation of the motor 23 interrupted. The control thus operates initially with a true proportioning action to decrease the drying capacity of the tenter at a relatively rapid rate until equilibrium has been established between this capacity as determined by the position of the rheostat arm 21 and the reduced moisture content.

In the initial movement of the resistance element 101, the segment 126 will make contact with the brush 128 and will continue to move across the latter a distance corresponding to the proportioning movement above described. The resulting short-circuiting of the shading coils 122 starts the motor 120 in a direction to turn the rheostat arm 104 and the brush 128 counter-clockwise so as to follow-up the previous movement of the segment 127. Such movement of the arm 104 is in a direction to increase the shunt resistance and therefore the relay current, but its resultant effect in further changing the position of the regulating arm 21 will depend upon the manner in which the moisture content in the cloth changes following the initial increase in the speed of the tenter motor.

If, for example, moisture content of the cloth remains at the reduced value after the rheostat arm 21 has reached its new equilibrium position corresponding to the changed moisture content, the continued counter-clockwise movement of the brush 128 will increase the shunt resistance and therefore the relay current above the balance value, the control switch 31 becoming closed. This initiates further counter-clockwise movement of the rheostat arm 21 to further decrease the drying capacity of the tenter. Since the winding 101 moves faster than the brush 104, the net effect will be to decrease the relay current and the switch 31 will again be opened after a short movement of the rheostat arm. Thus, until the decreased capacity of the tenter becomes effective in increasing the moisture content of the cloth, the relay current will be increased and decreased alternately in different amounts such that the rheostat arm will be advanced intermittently in a direction to increase the speed of the tenter motor.

Now, assume that the decreased drying capacity of the tenter has become effective at the outlet end of the drying chamber and that the moisture content of the cloth is being increased at a rate slower than that at which the effective control point of the system is being restored by counter-clockwise movement of the shaft 113. Under these conditions, the increments of counter-clockwise movement of the rheostat arm 21 will continue intermittently but will be of shorter lengths due to the fact that, following each closure of the relay switch 31, less movement of the shaft 25 will be required in order to cause opening of the switch at the increased moisture content. Thus, the rheostat arm 21 will continue to move intermittently in the counter-clockwise direction at an average rate determined by the difference between the rate of decrease of the relay current in response to the increase in moisture content and the rate of increase of the relay current by turning of the brush 104.

If, on the other hand, the moisture content begins to rise and cause the relay current to increase at a rate greater than the corresponding rate of increase due to operation of the motor 120 but slower than the rate of shift during operation of the motor 23, the relay switch 32 will become closed thereby short-circuiting the shading coils 30 and initiating clockwise movement of the shaft 25 so as to cause the drying capacity of the tenter to be increased. As an incident to this, the resistance element 101 turns clockwise causing the relay current to be increased more rapidly than the current is being increased by counter-clockwise movement of the brush 128. Therefore, the switch 32 becomes opened and the motor 23 stopped momentarily. As this cycle is repeated, the rheostat arm 21 will be moved intermittently in a direction to increase the drying capacity of the tenter, this being at an average rate corresponding in magnitude to the amount the rate of moisture content decrease exceeds the rate of adjustment by the auxiliary mechanism including the motor 120.

As a result of the above described action of the auxiliary adjusting mechanism after the decreased drying capacity has actually become effective in increasing the moisture content of the cloth, the brush 128 will be advanced toward the segment 127. Evenutally, it will engage the segment when the moisture content has been restored fully to the predetermined desired value as evidenced by positioning of the switch arm 49 between the stationary switch contacts at the time when the brush 128 contacts the segment 127. The operation of the motor 120 is thus interrupted.

The control operates in a similar manner in response to a relatively rapid rise in moisture content above the desired value. Such a change causes the switch 32 to be closed resulting in short-circuiting of the shading coils 30 which initiates rapid movement of the rheostate operating shaft 25 in the clockwise direction so as to increase the drying capacity of the tenter. In the initial movement, the segment 125 engages the brush 128 thereby short-circuiting the shading coils 121 to initiate operation of the motor 120 in a direction to decrease the shunt resistance and the relay current. For the reasons set forth above, the rheostat arm 21 will continue to move intermittently in a clockwise direction and at a slow average rate until the increased drying capacity of the tenter becomes effective at the electrodes 40 and 41. Then, the clockwise movement will continue or counter-clockwise movement will begin depending on the rate at which the moisture content decreases relative to the rate of decrease of the relay current by continued operation of the motor 120. Eventually, when the increased drying action has reduced the moisture content of the cloth to the desired value and the control mechanism has, by engagement of the brush 128 and the segment 127, been restored to normal condition, movement of the shaft 25 will be interrupted.

It will be seen from the foregoing that in response to a relatively rapid moisture content change of substantial magnitude, the control first operates with a true proportioning action. That is to say, the arm 21 is moved at a relatively rapid rate determined by the speed of the shaft 25 to a position corresponding to the magnitude of deviation in the moisture content. As a result, the drying capacity of the tenter is changed rapidly so that the amount of correction for the deviation will be made at a rate proportional to the amount of the deviation. Then after equilibrium between the position of the rheostat arm 21 and the changed moisture content has been established, the action of the control is changed to that of the floating type. That is to say, the rheostat arm 21 is permitted to move beyond said equilibrium position at a substantially slower speed, and the drying capacity of the apparatus is further changed in the same direction so as to effect a restoration of the moisture content in the cloth to the desired value. In other words, slow movement of the rheostat arm 21 in the proper direction continues so long as any deviation in the moisture content of the cloth sample persists. If, however, such overrunning in the position of the rheostat arm 21 beyond the equilibrium position results in a relatively rapid restoration of the moisture content after the changed rate of drying capacity has become effective at the electrodes 40 and 41, the advance of the rheostat arm 21 is retarded. Or, in the event that the rate of correction exceeds a predetermined value governed by the speed of the shaft 113, movement of the rheostat arm may actually be reversed while the deviation in moisture content still persists. In this way, the desired floating type of correcting action is obtained without the attendant danger of producing objectional overrunning of the moisture content from the value desired to be maintained.

In response to gradual changes in moisture content, the present control operates in the manner described above with a characteristic floating action, the arm 21 being advanced at a substantially continuous slow rate throughout the continuance of the moisture content deviation. For example, whenever the moisture content falls sufficiently to cause closure of the switch 31, the shading coils 29 become short-circuited and counter-clockwise movement of the rheostat arm 21 is initiated. This movement is interrupted as soon as the relay current has been decreased sufficiently to open the switch 31. Since the segment 126 will then be in contact with the brush 128, the motor 120 will operate in a direction to increase the relay current and again effect closure of the switch 31. In this way, the rheostat arm 21 is advanced intermittently in a direction to decrease the drying capacity during the continuance of a fall in moisture content below the desired value. The average rate of this correcting movement will, for the reasons set forth above, vary with the manner in which the moisture content deviates.

Experience has shown that by adjustment of the speed at which the rheostat arm 104 is restored to its normal position, the number of operations of the motor 23 required in order to readjust the tenter motor speed following a deviation of the moisture content from the desired control point may be reduced. Such variation in motor speed may be effected by adjustment of the pump 119a.

Considering the mode of operation above described, it will be seen that the present control adapts itself automatically to changes in the character of the conditioning demand and operates in a manner most effective for accurate maintenance of the moisture content.

*Auxiliary controls*

Provision is also made for disabling the automatic control and adapting the rheostat actuating motor 23 for manual control as is frequently necessary in the operation of a conditioning apparatus such as the tenter above described. During manual control, however, the condition of the automatic control mechanism is not changed in order to facilitate automatic reestablishment of the controlled condition upon reverting to automatic control.

To the foregoing ends, the application of current to the tenter motor 13 is controlled by switches 131 and 132 which are held closed when a relay 133 is energized. This is effected by closure of a push button start switch 134 which is interposed in a conductor 134a connecting the relay winding to the direct current power lines, the winding being held energized by a locking circuit including a normally closed stop switch 136 and a switch 135 which is closed when the relay is energized. If desired, a motor starting mechanism of any well known construction may be interposed between the tenter motor and its control switches 131 and 132.

Whenever the tenter motor is energized, a relay winding 137 connected in parallel with the motor is energized and a switch 138 thereby held closed. The latter switch controls a locking circuit for the winding 139 of a relay 140. This circuit extends from one alternating current power line through a conductor 141, the winding 139, a conductor 142, a locking switch 143 which is closed when the relay 140 is energized, a conductor 144 in which the switch 138 is interposed, a switch 145 having a movable contact arm 146 pivoted at 147 and a conductor 148. The relay winding 139 may be energized independently by closure of a manually operable push button switch 149 interposed between conductors 142 and 144. When the switch 145 is opened by movement of the arm 146 in either direction away from the position shown in Fig. 4, the relay 140 is deenergized thereby opening a switch 150 included in the conductor 34. The circuits by which both pairs of shading coils 29 and 30 are controlled from the switches 31 and 32 are thus opened thereby disabling the automatic control.

The shading coils 29 by which the motor 23 is operated to increase the tenter motor speed may be short-circuited independently by moving the arm 146 into engagement with contacts 151 thereby connecting the common terminal of the shading coils to a conductor 152 leading to the conductor 35. Similarly, by moving the arm 146 into engagement with contacts 153, a short-circuit will be established for the coils 30 including a conductor 154 leading to the conductor 36. Thus, by manipulation of the arm 146 and the push button switches 134, 136, and 149, both manual and automatic controls may be rendered operative selectively, the automatic control always being disabled automatically as an incident to rendering the manual control operative.

To avoid disturbing the positions of the parts of the automatic control mechanisms, particularly of the rheostat 100, during manual adjustment of the tenter motor speed, provision is made for disabling the drive from the motor 120 and for locking the resistance element 101 to the contact arms 104 and 129. To this end, the shaft 115 is supported in its bearings for axial movement between the normal position shown and a position in which the pinion 117 is disengaged from the gear 118 and in mesh with a gear 156 fast on the disk 109. In this latter position, the shafts 25 and 113 are positively connected together through the medium of the shaft 115.

The two clutches thus formed by the pinion 117 cooperating with the gears 118 and 156 are controlled by a spring 157 acting in compression to shift the shaft 115 axially in one direction and a solenoid 158 acting on the armature 159 on the shaft. The energizing circuit for the solenoid 158 extends through a switch 160 which is maintained open when the relay 140 is energized. When the relay is deenergized to adapt the mechanism for manual control, the switch 160 closes thereby energizing the solenoid to disengage the pinion 117 from the gear 118 and in the same movement of the shaft 115 to connect the shafts 25 and 113. During manual adjustment of the tenter motor speed, the position of the contact arm 104 with respect to the resistance element 101 will not be disturbed. When the automatic control is again restored, the solenoid will become deenergized to again render the drive of the motor 120 operative.

I claim as my invention:

1. A control system having, in combination, a regulating member, a power operator for moving said member at an approximate predetermined speed, automatic condition-responsive mechanism controlling the operation of said operator and including an electrical device adapted to be variably energized to vary the effective control point of said mechanism, means for varying the energization of said device progressively with changes in the position of said member including two relatively movable elements one movable in unison with said member, actuating means responsive to relative movement between said elements out of a predetermined positional relation in either direction to cause relative movements between the elements to restore said positional relation but at a rate slower than said predetermined speed, manually operable means for controlling said operator independently of said mechanism, and means operating automatically as an incident to operation of said manually operable means to disable said actuating means.

2. A control system having, in combination, a regulating member, a power operator for moving said member at a predetermined speed, automatic condition-responsive mechanism controlling the operation of said operator and including an electrical device adapted to be variably energized to vary the effective control point of said mechanism, means for varying the energization of said device progressively with changes in the position of said member including two relatively movable elements one movable in unison with said member, a reversible actuator for relatively moving said elements at a rate slower than said predetermined speed, means responsive to relative movement between said elements out of a predetermined positional relation in either direction to initiate operation of said actuator in a direction to cause relative movements between the elements to restore said positional relation, and means operable selectively either to connect said actuator to said elements or to cause the elements to move in unison with said member.

3. A control system having, in combination, a regulating member, a power operator for moving said member at a predetermined speed, automatic condition-responsive mechanism controlling the operation of said operator and including an electrical device adapted to be variably energized to vary the effective control point of said mechanism, means for varying the energization of said device progressively with changes in the position of said member including two relatively movable elements one movable in unison with said member, means responsive to relative movement between said elements out of a predetermined positional relation in either direction to cause relative movements between the elements to restore said positional relation but at a rate slower than said predetermined speed, and selectively operable means for disabling said last mentioned means and connecting said elements together for movement in unison with said member.

4. A control system having, in combination, a regulating member, a power operator for moving said member at a predetermined speed, automatic condition-responsive mechanism controlling the operation of said operator and including an electrical device adapted to be variably energized to vary the effective control point of said mechanism, means for varying the energization of said device progressively with changes in the position of said member, and selectively operable means for disabling said last mentioned means.

5. A control system having, in combination, a regulating member, a power operator for moving said member at a predetermined speed, automatic condition-responsive mechanism controlling the operation of said operator and including an electrical device adapted to be variably energized to vary the effective control point of said mechanism, means for varying the energization of said device progressively with changes in the position of said member, manually operable mechanism for controlling said operator independently of said mechanism, and means for maintaining a fixed condition of said means during the control of said operator by said manually operable mechanism.

6. In a system for maintaining a uniform condition in a medium the electrical resistance of which varies with changes in said condition, the combination of a regulating member movable varying distances in opposite directions to increase and decrease the value of said condition, a pair of electrodes with said medium disposed therebetween, a vacuum tube having a grid and output circuit, a manually adjustable resistance, a pair of resistors of predetermined relative resistances, an electrical circuit, selectively operable means for interposing either said resistors or said electrodes and variable resistance in said circuit, and means for impressing the voltage drop across one of said resistors or across said electrodes onto said grid, means for indicating the value of the current in said output circuit, and an electrical relay responsive to deviations of the output current in opposite directions from a predetermined value for controlling the direction and extent of movement of said member.

7. In a system for maintaining a uniform condition in a medium the electrical resistance of which varies with changes in said condition, the combination of a pair of electrodes with said medium disposed therebetween, a vacuum tube having a grid and output circuit, a manually adjustable resistance, a pair of resistors of predetermined relative resistances, an electrical circuit, selectively operable means for interposing either said resistors or said electrodes and variable resistance in series relation in said last mentioned circuit, and for impressing the voltage drop across one of said resistors or across said electrodes onto said grid, and means for measuring the current in said output circuit.

8. In a system for maintaining a uniform condition in a medium having an electrical characteristic which varies with changes in said condition, the combination of a regulating member movable varying distances in opposite directions to increase and decrease the value of said condition, a vacuum tube having an input circuit, means variably energizing said circuit in accordance with variations in said characteristic, an output circuit for said tube, a balanced electrical relay energized in accordance with changes in the current in said output circuit and having an armature movable in opposite directions from a neutral position, means responsive to the opposite movements of said armature to cause movement of said member in corresponding directions, a shunt in parallel with said relay, mechanism operable to vary the impedance of said shunt with the movements of said member, two rheostats respectively controlling the relay and shunt circuits, and means by which said rheostats may be operated in unison to vary the range of movement of said member in response to given variations of said characteristic.

9. In a system for maintaining a uniform condition in a medium having an electrical characteristic which varies with changes in said condition, the combination of a regulating member movable varying distances in opposite directions to increase and decrease the value of said condition, a vacuum tube having input and output circuits, a balanced electrical relay energized in accordance with current changes in said output circuit, control means actuated by said relay for determining the direction and extent of movement of said member, means responsive to changes in said electrical characteristic and controlling said input circuit, a variable impedance connected in parallel with said relay, mechanism operable to very the value of said impedance with the movements of said member whereby to position the member in proportion to the magnitude of said characteristic, and manually adjustable means for varying the range of proportioning action while maintaining a fixed ratio between the current through said relay and impedance.

10. In a system for maintaining a uniform condition in a medium the electrical resistance of which varies with changes in said condition, the combination of a regulating member movable varying distances in opposite directions to increase and decrease the value of said condition, a power operator for actuating said member, a circuit energized by alternating current, a pair of electrodes interposed in said circuit and having said medium disposed therebetween, a vacuum tube having a grid and an output circuit, means for impressing the voltage drop between said electrodes onto said grid, an electrical relay responsive to deviations of the current in said output circuit and controlling said operator to vary the position of said member.

11. In a system for maintaining a uniform condition in a medium the electrical resistance of which varies with changes in said condition, the combination of a regulating member movable varying distances in opposite directions to increase and decrease the value of said condition, an electrical circuit having therein a manually adjustable rheostat providing a variable resistance and a pair of electrodes with said medium disposed therebetween providing a second variable resistance, a vacuum tube having a grid and output circuit, means for impressing the voltage drop across one of said resistances onto said grid, an electrical relay responsive to deviations of the current in said output circuit in opposite directions from a predetermined value, and means controlled by said relay for varying the position of said member.

12. In a system for maintaining a uniform condition in a medium having an electrical characteristic which varies with changes in said condition, the combination of a regulating member movable varying distances in opposite directions to increase and decrease the value of said condition, a vacuum tube having input and output circuits, a balanced electrical relay energized to a degree corresponding to the current in said output circuit and having an armature movable in opposite directions from a neutral position to cause movement of said member in corresponding directions, means responsive to changes in said electrical characteristic for controlling said input circuit, a shunt of variable resistance connected in parallel with said relay, and mechanism operable to vary the resistance of said shunt with the movement of said member.

13. In a system for maintaining a uniform condition in a medium having an electrical characteristic which varies with changes in said condition, the combination of a regulating member movable varying distances in opposite directions to increase and decrease the value of said condition, a balanced electrical relay having an armature movable in opposite directions respectively when the relay is energized above and below a predetermined degree, control devices actuated in said opposite movements to cause movement of said member in corresponding directions, means providing an electrical circuit extending through said medium and operating to measure said electrical characteristic and to energize said relay correspondingly, and mechanism operating automatically in response to the resulting movements of said member to change the degree of energization of said relay in a reverse direction until said predetermined energization has been reestablished.

14. In a system for maintaining a uniform condition in a medium having an electrical characteristic which varies with changes in said condition, the combination of a regulating member movable varying distances in opposite directions to increase and decrease the value of said condition, a vacuum tube having input and output circuits, a relay energized in accordance with current changes in said output circuit and having an armature movable in opposite directions from a neutral position to cause movement of said member in corresponding directions, means responsive to changes in said electrical characteristic for controlling said input circuit, an impedance in parallel with said relay, and mechanism operable to vary the value of said impedance automatically with the movements of said member.

15. In a system for maintaining a uniform condition in a medium having an electrical characteristic which varies with changes in said condition, the combination of a regulating member movable varying distances in opposite directions to increase and decrease the value of said condition, an electronic device having input and output circuits, a relay variably energized in response to current changes in said output circuit and having an armature movable in opposite directions from a neutral position, a power operator responsive to such movement of said armature to cause movement of said member in corresponding directions, means responsive to changes in said electrical characteristic for controlling said input circuit and thereby producing amplified changes in the output current, mechanism actuated automatically in unison with the movements of said member and operating to change the energization of said relay in a direction to restore said armature toward said neutral position, and automatic means operating in response to movement of said armature out of said neutral position to change the energization of said relay in the reverse direction but at a slower rate than the change produced by said mechanism.

16. In a system for maintaining a uniform condition in a medium having an electrical characteristic which varies with changes in said condition, the combination of a member movable varying distances in opposite directions to respectively cause an increase and a decrease in the value of said condition, a vacuum tube having input and output circuits, a relay variably energized in response to current changes in said output circuit and having an armature movable in opposite directions from a neutral position, a power operator responsive to opposite movement of said armature and operable to cause movement of said member in corresponding directions, means responsive to changes in said electrical characteristic for controlling said input circuit and thereby producing amplified changes in the output of said tube, mechanism actuated automatically with the movements of said member in response to movement of said armature away from said neutral position and operating to change the energization of said relay in a direction and by an amount sufficient to restore said armature to said neutral position.

17. In a system for maintaining a uniform condition in a medium having an electrical characteristic which varies with changes in said condition, the combination of a regulating member movable varying distances in opposite directions to increase and decrease the value of said condition, a vacuum tube having input and output circuits, a normally balanced relay variably energized in response to current changes in said output circuit, means responsive to conditions of unbalance of said relay and operable to cause movement of said member in a direction corresponding to the direction of unbalance, means responsive to changes in said electrical characteristic for controlling said input circuit and thereby producing amplified changes in the output current, and mechanism actuated automatically as an incident to movement of said member to change the energization of said relay in a direction to restore the balance thereof.

18. In a system for maintaining a uniform condition in a medium the alternating current resistance of which varies with changes in said condition, the combination of a pair of electrodes with said medium disposed therebetween and in contact therewith; regulating means for varying said condition; means for applying an alternating potential across said electrodes; means including a resistance, having a value substantially equal to that of the medium between said electrodes when said condition is normal, connected in series relation with said electrodes across said potential source, whereby the voltage drop across said electrodes is rendered substantially independent of the capacitive reactance of the medium; and means for actuating said regulating means in response to the voltage drop across said electrodes to maintain said condition substantially constant.

19. In a system for maintaining a uniform condition in a medium the alternating current resistance of which varies with changes in said condition, the combination of a pair of electrodes with said medium disposed therebetween and in contact therewith; regulating means for varying said condition; means for applying an alternating potential across said electrodes; means including a resistance, having a value substantially equal to that of the medium between said electrodes when said condition is normal, connected in series relation with said electrodes across said potential source, whereby the voltage drop across said electrodes is rendered substantially independent of the capacitive reactance of the medium; a vacuum tube having a grid and output circuit; means for impressing the voltage drop across said electrodes onto said grid; and means for actuating said regulating means in response to the current in said output circuit for maintaining said condition substantially constant.

AUSTIN S. NORCROSS.

CERTIFICATE OF CORRECTION.

Patent No. 2,244,722.   June 10, 1941.

AUSTIN S. NORCROSS.

It is hereby certified that error appears in the printed specification of the above numbered patent requiring correction as follows: Page 1, second column, line 15, for the word "though" read --through--; page 2, second column, line 60, for "because" read --across--; page 5, first column, line 67, for "rheostate" read --rheostat--; page 7, second column, line 65, claim 9, for "very" read --vary--; page 8, first column, line 48, and second column, lines 24 and 51, claims 12, 15, and 16 respectively, for "movement" read --movements--; same page, first column, line 61, claim 13, for "electrical" read --electric--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.